No. 647,538. Patented Apr. 17, 1900.
J. P. TAYLOR.
BICYCLE SUPPORT.
(Application filed Mar. 21, 1898.)
(No Model.)
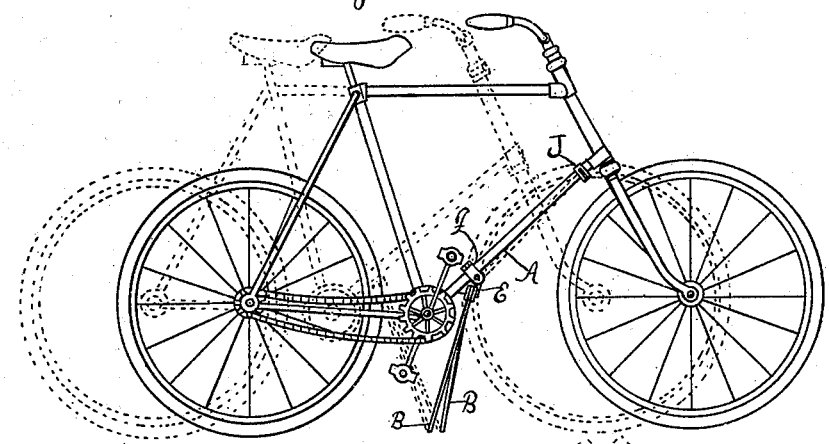
Fig. 1.
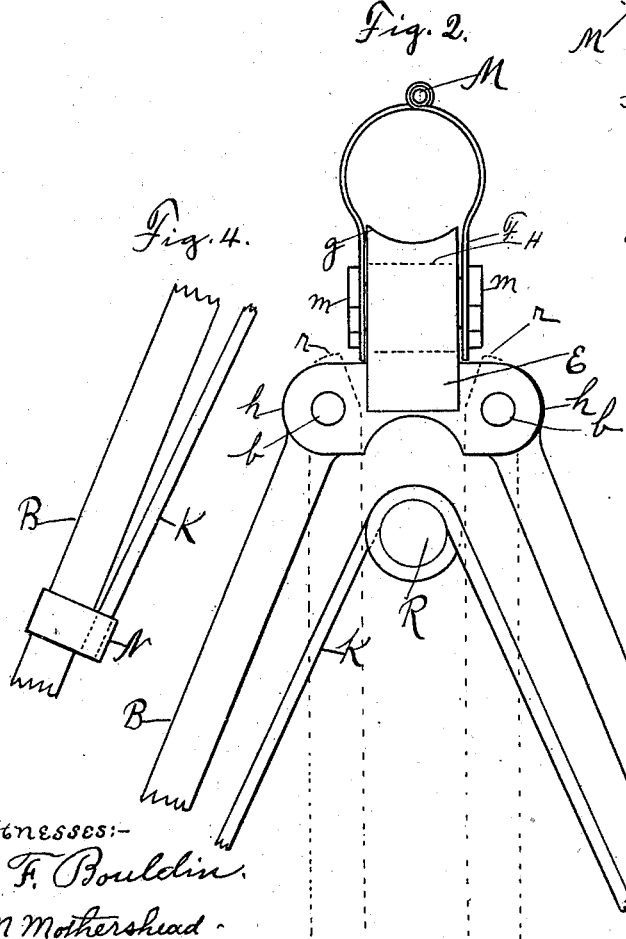
Fig. 2. Fig. 3. Fig. 4. Fig. 5.
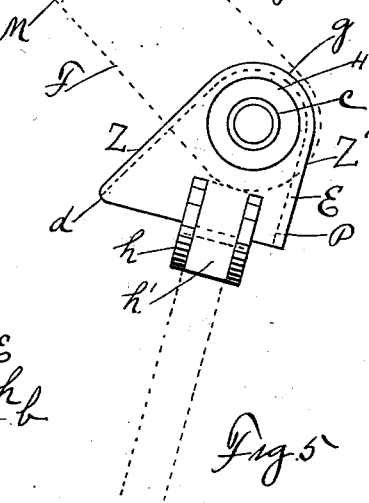
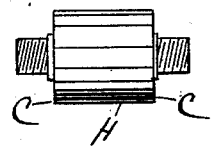
Witnesses:—
B. F. Bouldin.
J. M. Mothershead.
Inventor,
J. P. Taylor.
By A. L. Jackson,
his Atty.
THE NORRIS PETERS CO., PHOTO-LITHO., WASHINGTON, D. C.

UNITED STATES PATENT OFFICE.

JAMES P. TAYLOR, OF FORT WORTH, TEXAS.

BICYCLE-SUPPORT.

SPECIFICATION forming part of Letters Patent No. 647,538, dated April 17, 1900.

Application filed March 21, 1898. Serial No. 674,634. (No model.)

*To all whom it may concern:*

Be it known that I, JAMES P. TAYLOR, a citizen of the United States, residing at Fort Worth, Texas, have invented a new and Improved Bicycle-Support, of which the following is a specification.

My invention relates to a support for holding bicycles in upright position when not in use; and one object is to construct a support which is light and strong and by which a bicycle can be braced from four directions and on which almost the entire weight of the bicycle can be thrown, so that the weight of the bicycle is utilized for its own support.

Other objects and advantages will be better understood from the following description and claims when read in connection with the accompanying drawings, which form a part of this application.

Figure 1 is a side elevation of a bicycle with the support applied and supporting the bicycle. Fig. 2 is a broken front elevation of the support, showing the means for attaching the same to a bicycle. Fig. 3 is a side elevation of the block to which the legs are pivotally attached. Fig. 4 is a detailed view showing the manner of attaching the spring to the leg. Fig. 5 is a view of the rock-shaft.

Similar characters of reference are used to indicate corresponding parts throughout the several views.

The bicycle rests when not in use almost entirely on the supports B B, which are pivotally attached to the lower front tube A of the bicycle. The supports are attached to this tube by means of a block E, a hinged clip F, and a rock-shaft H, provided with nuts $m\ m$. Block E has ears $h\ h$, which have slots $h'$ therein. The legs B B are pivotally mounted in said slots by means of pivot-bolts $b\ b$. The dotted outline in Fig. 2 illustrates the position of the legs when closed and not in use. The outward spread of the legs is limited by the shoulders or upward extensions $r\ r$ of the legs B B, which shoulders come to rest against the block E when in use and occupy the positions shown by dotted lines in Fig. 2. The legs B B are spread automatically by the spring K, which operates between the legs and is attached to the legs by means of bands N. This band may be held in place and the spring may be held in the band by soldering or in any practical way. The block E is substantially triangular in shape, the upper corner being rounded and having a groove extending on two sides, the shape of which is shown in Fig. 2 and the depth of which is shown in Fig. 3 by dotted line P. The groove is adapted to conform to the tube A as the block is turned or rocked on the rock-shaft H. The clip F consists of two parts hinged together by the hinge M. The block E is pivotally mounted in this clip by means of the rock-shaft H. The apertures in the clip for this shaft are smaller than the aperture in the block E. Shoulders $c\ c$ on the shaft H prevent the clip from binding on the block E. When the legs of the clip are forced in by the nuts $m\ m$, the legs stop against the shoulders $c\ c$, and thus the block is left free to rock in the clip. The backward swing of the legs is limited by the block E. The side Z of the block comes against the tube A. The block cannot turn any farther than the side Z because the distance from the center of the rock-shaft H to the corner $d$ of the block is so much greater than the distance from the center of said shaft to the upper corner $g$ of the block. The angle which the legs B B make with the plane of support is determined by the shape of the block E. When the support is not in use, the legs are folded and held in the bracket J. In this position the legs lie close to the tube A and are not in the way of the rider, as shown by dotted line in Fig. 1. When the legs are in the bracket, the side $Z'$ is turned next to the tube A. The ears $h\ h$ are made integral with the block E, and the tops of the legs B B fit close in the slots to make the support rigid. The clip F is to be mounted at such place on the tube A that one half the weight of the bicycle will be in front and the other half in the rear of the support. The spring K is to be coiled at the point R as many times as may be practical.

The manner of mounting the bicycle on the support may be described as follows: In Fig. 1 the full-line illustration is the bicycle after it is mounted on the support and the dotted outline is the position of the bicycle before it is mounted. Suppose the bicycle is in the position of the dotted outline. Take the legs out of bracket J and bring them to the plane of support. Resting the bottoms of the legs on the plane of support, raise the rear part of the bicycle upward and at the same time shove the bicycle forward until the side Z of block E comes against the tube A. The bicycle will then be in the position illustrated by the full lines in Fig. 1. In moving the bicycle forward the rear wheel must be raised up to follow the arc of a circle similar to that described by the tops of the legs, the bottoms of the legs being pivoted on the plane of support. The center of gravity of the bicycle is in a line passing through the pivot-points in block E. This clip passes from the unmounted position and describes an arc of a circle in the forward motion. The support by means of the side Z of block E tends to arrest the bicycle before the clip makes the arc of the circle as low in the mounted position as it was in the unmounted position. The bicycle is braced in four directions—on the sides by the legs, in the rear by the support in combination with the tube A and the weight of the bicycle, and in front also by the support in combination with tube A and the weight of the bicycle. When supported, the bicycle cannot go backward without being raised at least as high as the arc of a circle of which the legs are the radius and the points on which the legs rest the center, and as the bicycle cannot raise itself it must stand still. The bicycle cannot go forward without dragging the legs on the ground or floor, and the friction will be great enough ordinarily to prevent the bicycle from going forward, since the entire weight of the bicycle rests on the support.

Having fully described my invention, what I claim as new, and desire to secure by Letters Patent, is—

1. A bicycle-support consisting of a hinged clip mounted on the lower front tube of the bicycle, a rock-shaft supported by said clip, a triangular block mounted on said rock-shaft having one corner round and a groove on the upper and front sides extending over said round corner adapted to conform to the contour of said tube, two legs pivotally attached to said block and having a limited lateral swing, and a spring for automatically spreading said legs, said block being adapted to limit both the lateral and the backward swing of said legs whereby backward and forward motion of the bicycle is prevented and the bicycle is braced on each side.

2. A bicycle-support consisting of a triangular block having ears on each side of and integral therewith and slots therein, a pair of legs pivoted in said slots and having upward extensions adapted to rest against the back walls of said slots to limit the outward swing of said legs, a spring attached to said legs for automatically spreading the same, a rock-shaft mounted in said block, and a hinged clip for mounting said support on the bicycle-frame, said shaft having shoulders to prevent said clip from binding said block, said block having a round corner and having the sides adjacent to said corner curved adapted to conform to the contour of the tubular frame-piece of the bicycle, the rear side of said block limiting the backward swing of said legs.

In testimony whereof I set my hand, in the presence of two witnesses, this 17th day of March, 1898.

JAMES P. TAYLOR.

Witnesses:
W. T. HILES,
C. L. McDANIEL.